United States Patent
Mori

(10) Patent No.: US 12,516,169 B2
(45) Date of Patent: Jan. 6, 2026

(54) STRETCH FILM AND METHOD FOR PRODUCING SAME

(71) Applicant: C.I. TAKIRON CORPORATION, Osaka (JP)

(72) Inventor: Keiichi Mori, Osaka (JP)

(73) Assignee: C.I. TAKIRON CORPORATION, Osaka (JP)

( * ) Notice: Subject to any disclaimer, the term of this patent is extended or adjusted under 35 U.S.C. 154(b) by 658 days.

(21) Appl. No.: 17/916,758

(22) PCT Filed: Mar. 10, 2021

(86) PCT No.: PCT/JP2021/009627
§ 371 (c)(1),
(2) Date: Oct. 3, 2022

(87) PCT Pub. No.: WO2021/205805
PCT Pub. Date: Oct. 14, 2021

(65) Prior Publication Data
US 2023/0151170 A1    May 18, 2023

(30) Foreign Application Priority Data
Apr. 9, 2020    (JP) .................. 2020-070204

(51) Int. Cl.
*C08J 9/00*     (2006.01)
*B29C 55/04*    (2006.01)
(Continued)

(52) U.S. Cl.
CPC ............. *C08J 9/0061* (2013.01); *B29C 55/04* (2013.01); *B29D 7/01* (2013.01); *C08J 9/0066* (2013.01);
(Continued)

(58) Field of Classification Search
CPC .... C08J 9/0061; C08J 9/0066; C08J 2300/26; C08J 2323/12; C08J 2323/14;
(Continued)

(56) References Cited

U.S. PATENT DOCUMENTS 5,445,862 A * 8/1995 Kaneko ............ C08L 23/04
428/323
2005/0043699 A1    2/2005 Minato
(Continued)

FOREIGN PATENT DOCUMENTS

JP    H01-123838 A    5/1989
JP    2005-058755 A   3/2005
(Continued)

OTHER PUBLICATIONS

Extended European Search Report for EP Patent Application No. 21784725.0 dated Sep. 28, 2023 (7 pages).
(Continued)

*Primary Examiner* — K. Boyle
(74) *Attorney, Agent, or Firm* — Buchalter, a Professional Corporation

(57) ABSTRACT

A stretch film (1) contains an olefin elastomer and an inorganic filler (3). Stress at 50% elongation is 6.0 N or more and 15.0 N or less, and moisture permeability is 1000 g/(m²·24 h) or more.

12 Claims, 1 Drawing Sheet

(51) Int. Cl.
  *B29D 7/01* (2006.01)
  *C08K 3/013* (2018.01)
  *B29K 23/00* (2006.01)

(52) U.S. Cl.
  CPC .......... *C08K 3/013* (2018.01); *B29K 2023/12* (2013.01); *C08J 2300/26* (2013.01); *C08J 2323/12* (2013.01); *C08K 2201/005* (2013.01)

(58) Field of Classification Search
  CPC .. C08J 2423/04; C08J 5/18; C08J 9/00; B29C 55/04; B29C 55/005; B29C 55/06; B29D 7/01; C08K 3/013; C08K 2201/005; C08K 2003/265; C08K 3/26; B29K 2023/12; C08L 2203/16; C08L 2205/0335; C08L 23/14; C08L 23/16; C08L 23/04
  See application file for complete search history.

(56) References Cited

U.S. PATENT DOCUMENTS

| | | |
|---|---|---|
| 2018/0133357 A1 | 5/2018 | Takeda et al. |
| 2018/0133951 A1 | 5/2018 | Takeda et al. |
| 2020/0362130 A1 | 11/2020 | Tanaka et al. |

FOREIGN PATENT DOCUMENTS

| | | |
|---|---|---|
| JP | 2016-204625 A | 12/2016 |
| JP | 2016-204634 A | 12/2016 |
| JP | 2019-017534 A | 2/2019 |
| WO | WO 2019/107555 A1 | 6/2019 |

OTHER PUBLICATIONS

International Search Report and Written Opinion for PCT/JP2021/009627 (ISA/JP) mailed Jun. 1, 2021 (9 pages).

* cited by examiner

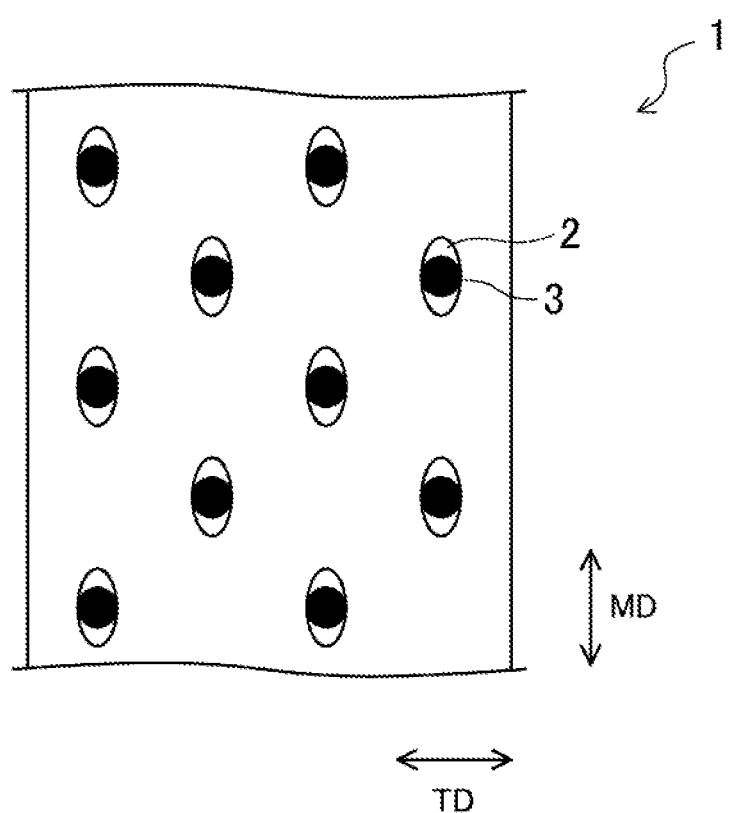

STRETCH FILM AND METHOD FOR PRODUCING SAME

CROSS REFERENCE TO RELATED APPLICATIONS

This application is a national stage application, filed under 35 U.S.C. § 371, of International Application No. PCT/JP2021/009627, filed Mar. 10, 2021, which claims priority to Japanese Application No. 2020-070204, filed Apr. 9, 2020; the contents of both of which as are hereby incorporated by reference in their entireties.

BACKGROUND

Technical Field

The present disclosure relates to stretch films and methods for producing the same.

Description of Related Art

Stretch films made of a stretchable elastomer and composite laminates of such a stretch film and a nonwoven fabric are widely used in, for example, the sanitation field (such as menstrual products and incontinence products) and the medical field (such as surgical drapes).

For example, a stretch film containing an olefin resin and a filler has been proposed as such a stretch film. The content of the filler is 100 to 300 parts by weight per 100 parts by weight of the olefin resin, and the stretch film has voids in its surface. It is described that, with such a configuration, a stretch film having excellent stretchability and excellent moisture permeability (breathability) can be provided (see, for example, Patent Document Japanese Unexamined Patent Publication No. 2016-204634).

BRIEF SUMMARY

However, the stretch film described in Patent Document 1 cannot be formed into desired dimensions because this stretch film tends to stretch when performing a winding process during film production or when producing hygiene products etc. using the stretch film. This stretch film is obtained by producing an unstretched film and then stretching the unstretched film. However, since the stretch film shrinks after this stretching process, voids formed in the surface by the stretching become smaller or disappear. Therefore, desired moisture permeability cannot be obtained.

The present invention was made in view of the above problems, and it is an object of the present invention to provide a stretch film whose stretching is prevented and which has both excellent stretchability and moisture permeability, and a method for producing the same.

In order to achieve the above object, a stretch film of the present invention contains an olefin elastomer and an inorganic filler, and is characterized in that stress at 50% elongation is 6.0 N/mm$^2$ or more and 15.0 N/mm$^2$ or less and moisture permeability is 1000 g/(m$^2$·24 h) or more.

A method for producing a stretch film includes at least the steps of: preparing a primary film containing an olefin elastomer and an inorganic filler; and uniaxially stretching the primary film, and is characterized in that a stretching temperature during film forming by the uniaxial stretching is 20° C. or more and 60° C. or less, and a stretch ratio is 1.8 times or more and 4.5 times or less.

According to the present invention, a stretch film having both excellent stretchability and moisture permeability and a method for producing the same can be provided.

BRIEF DESCRIPTION OF THE FIGURES

FIG. 1 is a schematic view illustrating a stretch film according to an embodiment of the present invention.

DETAILED DESCRIPTION OF VARIOUS EMBODIMENTS

Hereinafter, a stretch film of the present invention will be specifically described. The present invention is not limited to the following embodiment, and can be modified and applied as appropriate without departing from the spirit and scope of the present invention.

The stretch film of the present invention is a formed film containing an olefin elastomer and an inorganic filler.

<Olefin Elastomer>

Examples of the olefin elastomer used in the present invention include copolymers or homopolymers containing an olefin having 3 or more carbon atoms as a main component and copolymers of an ethylene as a main component and an olefin having 3 or more carbon atoms.

More specific examples include: (1) α-olefin homopolymers having low stereoregularity such as propylene homopolymers and 1-butene homopolymers; (2) α-olefin copolymers such as propylene-ethylene copolymers, propylene-ethylene-1-butene copolymers, 1-butene-ethylene copolymers, 1-butene-propylene copolymers, 4-methylpentene-1-propylene copolymers, 4-methylpentene-1-1-butene copolymers, 4-methylpentene-1-propylene-1-butene copolymers, propylene-1-butene copolymers, ethylene-propylene copolymers, ethylene-hexene copolymers, and ethylene-octene copolymers; and (3) ethylene-α-olefin-diene terpolymers such as ethylene-propylene-ethylidene norbornene copolymers, ethylene-propylene-butadiene copolymers, and ethylene-propylene-isoprene copolymers. The above elastomers dispersed in a matrix of a crystalline polyolefin may also be used. The olefine elastomers may be used singly or in combination of two or more.

An olefin elastomer is typically composed of a hard segment that dominates basic physical properties such as mechanical properties, and a soft segment that dominates stretchability that is a rubber property. Olefin elastomers whose hard segment is polypropylene are called propylene elastomers, and olefin elastomers whose hard segment is polyethylene are called ethylene elastomers. Examples of the soft segment of the olefin elastomers include EPDM, EPM, EBM, IIR, hydrogenated styrene-butadiene rubber (HSBR), NBR, and acrylic rubber (ACM). For the propylene elastomers, the propylene unit content in all units is preferably 70% by mass to 95% by mass, more preferably 80% by mass to 90% by mass. With the propylene unit content as the hard segment being 70% by mass or more, the strength is improved, so that excellent moldability can be obtained. With the propylene unit content being 95% by mass or less, excellent stretchability can be obtained by the elasticity of the soft segment.

From the standpoint of obtaining excellent stretchability, the content of the olefin elastomer in the entire stretch film is preferably 15% by mass or more and 50% by mass or less, more preferably 20% by mass or more and 40% by mass or less, out of 100% by mass of the stretch film. With the content of the propylene elastomer being within the above range, excellent stretchability can be obtained by the elasticity of the soft segment contained in the elastomer.
(Inorganic Filler)

The inorganic filler is a component for forming through pores by porosity formation. Stretching the film containing the inorganic filler allows the stretch film of the present invention to exhibit excellent moisture permeability.

Examples of the inorganic filler include calcium carbonate, zeolite, silica, titanium oxide, calcium oxide, magnesium oxide, zinc oxide, clay, mica, barium sulfate, and magnesium hydroxide. The inorganic fillers may be used singly or in combination of two or more.

The content of the inorganic filler in the entire stretch film is preferably 40% by mass or more and 70% by mass or less out of 100% by mass of the stretch film. With the content of the inorganic filler being within the above range, excellent stretchability can be obtained by performing the stretching process.

The mean particle size of the inorganic filler is preferably 0.8 to 10 um. With the mean particle size of the inorganic filler being 0.8 μm or more, secondary aggregation etc. of the inorganic filler is reduced, and satisfactory dispersibility of the inorganic filler into a resin can be obtained. With the mean particle size of the inorganic filler being 10 μm or less, no holes etc. will be formed by drawdown during extrusion, and excellent moldability can be obtained.

As used herein, the "mean particle size" refers to the 50th percentile particle size in the particle size distribution measured by a particle size analyzer.

<Other Component(s)>

The stretch film may contain a component(s) other than the above olefin elastomer within a range that does not impair the stretchability of the stretch film.

Examples of other component(s) include an olefin resin, an amide anti-blocking agent (such as stearic acid amide), a plasticizer, an ultraviolet absorber, an antioxidant, a weathering agent, an antistatic agent, a coloring agent, an antifogging agent, a metal soap, a wax, an antifungal agent, an antibacterial agent, a nucleating agent, a flame retardant, and a lubricant. Such other component(s) may be processed into masterbatch and added to the material for the stretch film.

(Olefin Resin)

A preferred olefin resin is an olefin resin compatible with the above olefin elastomer. For example, a polyethylene resin or a polypropylene resin is preferable. Olefin resins may be used singly or in combination of two or more.

For example, the olefin resin can be a linear low density polyethylene (LLDPE), a low density polyethylene (LDPE), or an ultra low density polyethylene (ULDPE).

From the standpoint of improving moisture permeability by contributing to fixing of pores, the content of the olefin resin in the entire stretch film is preferably 10% by mass or less out of 100% by mass of the stretch film. This is because when the content of the olefin resin is higher than 10% by mass, the stretchability of the film may be significantly reduced as normal polyethylene itself has no stretchability.

(Through Pores)

FIG. 1 is a schematic view showing the stretch film of the present invention. As shown in FIG. 1, the stretch film 1 of the present invention has a plurality of through pores 2. The through pores 2 are formed by stretching a primary film before porosity formation. In the stretch film 1 of the present invention, the primary film is made porous by stretching the primary film containing the above inorganic filler 3.

The diameter of the through pores is preferably 1 μm to 100 um. With the diameter being 1 μm or more, the pores will not be closed even in a stretchable material such as an elastomer, and excellent moisture permeability can be obtained. With the diameter being 100 μm or less, waterproof properties can be obtained.

The diameter of the through pores 2 is an average value of the opening diameters of randomly selected 50 through pores 2.

Method for Producing Stretch Film

Next, a method for producing the stretch film of the present invention will be described in detail.

The stretch film of the present invention is produced by molding a raw material containing the olefin elastomer and inorganic filler described above into a film using an extruder.

More specifically, first, the olefin elastomer, the inorganic filler, and as necessary, other component(s) such as an olefin resin described above are mixed at a predetermined mixture ratio, and extruded into strands by a co-rotating twin screw extruder equipped with a strand die etc. The strands are cut into pellets.

Next, these pellets are molded into a film by melt extrusion by a single screw extruder equipped with a T-die, and the film is wound on a take-up roll. A primary film before porosity formation is thus obtained.

The primary film is then made porous by uniaxial stretching. The stretch film 1 having a plurality of through pores 2 shown in FIG. 1 is thus produced.

The uniaxial stretching refers to a process of stretching the film in either a machine axial (longitudinal) direction (hereinafter referred to as "MD") or a direction perpendicular to this direction (hereinafter referred to as "TD") shown in FIG. 1.

The inventors examined the conditions under which the stretch film was able to have both excellent stretchability and moisture permeability and found that, by controlling the temperature (stretching temperature) and stretch ratio during film forming by the uniaxial stretching, stretching of the stretch film can be prevented and both excellent stretchability and moisture permeability can be obtained.

More specifically, the stretching temperature in the uniaxial stretching is 20° C. or more and less than 70° C. The reason for this is as follows. When the stretching temperature is less than 20° C., the formed through pores are closed due to the stretchability of the olefin elastomer, and sufficient moisture permeability may not be obtained. When the stretching temperature is 70° C. or more, the stretch film may melt and break.

When the olefin elastomer is a propylene elastomer, the stretching temperature is preferably 50° C. or more and less than 70° C., which is equal to or higher than the melting point of the propylene elastomer. When the stretching is performed at a temperature equal to or higher than the melting point, the resin is oriented, and the stress in the extending direction is therefore increased. Moreover, when the stretching is performed at a temperature equal to or higher than the melting point, the permanent strain is increased, and the stretchability of the stretch film is reduced. Therefore, the separated state between the inorganic filler and the resin tends to be fixed, and the moisture permeability is improved.

The "melting point" means the melting start temperature in a DSC chart. The melting start temperature of the propylene elastomer is typically 40° C. or more and 50° C. or less.

The stretch ratio in the uniaxial stretching is 1.8 times or more and 4.5 times or less. This is because when the stretch ratio is 1.8 times or more, porosity formation by the stretching process is facilitated and the moisture permeability of the stretch film is further improved, but when the stretch ratio is higher than 4.5 times, the film may break when elongated. As used herein, the "stretch ratio" refers to a multiple of the length of the film after the stretching with respect to the length of the film before the stretching in the extending direction.

As described above, in the present invention, the stretching temperature is set to 20° C. or more and less than 70° C., and the stretch ratio is set to 1.8 times or more and 4.5 times or less. Stretching of the film can thus be prevented, and a stretch film having both excellent stretchability and moisture permeability can be obtained.

In the stretch film of the present invention, stress at 50% elongation in the stretching direction (e.g., MD) of the film by the uniaxial stretching is 6.0 N/mm$^2$ or more and 15.0 N/mm$^2$ or less. Therefore, when performing a winding process during film production or when producing hygiene products etc. using the stretch film, stretching of the film can be prevented, and excellent stretchability can be obtained.

The "stress at 50% elongation in the stretching direction" can be obtained by the method that will be described later in the examples below.

Since the stretch film of the present invention has a moisture permeability of 1000 g/(m$^2$·24 h) or more, excellent moisture permeability can be obtained.

The "moisture permeability" refers to a value measured in accordance with JIS Z 0208 (testing methods for determination of the water vapor transmission rate of moisture-proof packaging materials (dish method)).

From the standpoint of stretching the stretch film with a small force, the stress at 50% elongation in the direction (e.g., TD) perpendicular to the extending direction (e.g., MD) of the film by the uniaxial stretching is preferably 3.0 N/mm$^2$ or less.

From a similar standpoint, the stress at 100% elongation in the direction (e.g., TD) perpendicular to the stretching direction (e.g., MD) of the film by the uniaxial stretching is preferably 3.0 N/mm$^2$ or less.

The "stress at 50% elongation in the direction perpendicular to the stretching direction" and the "stress at 100% elongation in the direction perpendicular to the stretching direction" can be obtained by the method that will be described later in the examples below.

When producing the stretch film, the permanent strain of the stretch film is preferably 25% or less. With the permanent strain of the stretch film being 25% or less, a stretch film having excellent stretchability can be obtained.

The "permanent strain" as used herein refers to a value calculated by the following method.

A strip of test piece of 25 mm in the machine axial direction (MD) and 100 mm in the direction (TD) perpendicular to the machine axial direction (MD) is cut from a stretch film, and the test piece is fixed to grips of a testing device (precision universal testing machine) at a distance between grips of 25 mm. The test piece is elongated in TD at a rate of 254 mm/min to 100% elongation (percentage elongation) as calculated by the following expression (1), and is then immediately shrunk at the same rate. The permanent strain [%] is calculated by the following expression (2).

[Math 1]

$$\text{Elongation [\%]} = (L1-L0)/L0 \times 100 \quad (1)$$

[Math 2]

$$\text{Permanent Strain [\%]} = (L2-L0)/L0 \times 100 \quad (2)$$

L0 represents the distance between grips (mm) before the elongation, L1 represents the distance between grips (mm) after the elongation, and L2 represents the distance between grips (mm) when the load (N/25 mm) on the test piece becomes 0 during the shrinking.

The thickness of the stretch film to be produced is preferably 10 to 80 μm, more preferably 20 to 60 μm. With the thickness of the stretch film being 10 μm or more, sufficient handling properties can be obtained regarding wrinkles during winding and cutting properties for trimming during slitting. With the thickness of the stretch film being 80 μm or less, sufficient moisture permeability can be obtained.

According to the method described above, in the present invention, a stretch film whose stretching is prevented and which has both excellent stretchability and moisture permeability can be obtained.

The stretch film layer may be composed of a single layer or multiple layers, namely two or more layers. When the stretch film layer is composed of multiple layers, the layers may have the same composition and thickness, or may have different compositions and thicknesses from each other. When the stretch film layer is composed of multiple layers, the thickness of the stretch film layer means the overall thickness of the multiple layers.

EXAMPLES

Hereinafter, the present invention will be described based on examples. The present invention is not limited to these examples. These examples can be modified and altered based on the spirit and scope of the present invention, and such modifications and alterations are not excluded from the scope of the present invention.

Materials used to produce the stretch film are as follows.

(1) Propylene elastomer (Vistamaxx (registered trademark) 6102FL (made by Exxon Mobil Corporation, propylene-ethylene copolymer, ethylene unit content: 16% by mass)
(2) LLDPE: linear low density polyethylene, density: 0.902 g/cm$^3$, MFR: 3.0 g/10 min (made by The Dow Chemical Company, product name: Affinity PL 1850G)
(3) LDPE: low density polyethylene, density: 0.922 g/cm$^3$, MFR: 0.3 g/10 min (made by Sumitomo Chemical Co., Ltd., product name: SUMIKATHENE F101-1)
(4) ULDPE: ultra low density polyethylene, density: 0.915 g/cm$^3$, MFR: 2.2 g/10 min (made by Japan Polyethylene Corporation, product name: Kernel KF282)
(5) Ethylene elastomer: density: 0.867 g/cm$^3$, MFR (230° C.): 7.0 g/10 min (made by Mitsui Chemicals, Inc., product name: TAFMER PN-2070)
(6) Lubricant: masterbatch containing LDPE as a base resin (made by RIKEN VITAMIN Co., Ltd., product name: Rikemaster ELM-080)
(7) Inorganic filler: calcium carbonate (made by SHIRAISHI CALCIUM KAISHA, LTD., product name: PO-150B-10)

Example 1

<Production of Stretch Film>

First, the materials shown in Table 1 were mixed to prepare a material of Example 1 having the composition (parts by mass) shown in Table 1. Next, this material was extruded into strands at 200° C. by a co-rotating twin screw extruder (made by The Japan Steel Works, Ltd., product name: TEX 28V-42CW-4V) equipped with a strand die. The strands were cut into pellets.

Next, these pellets were molded into a film by melt extrusion (extrusion temperature: 200° C.) by a single screw extruder (made by NAGATA SEISAKUSYO CO., LTD.) equipped with a T-die, and the film was wound on a take-up roll. A primary film before porosity formation was thus obtained.

Then, this primary film was made porous by uniaxial stretching in MD at the stretching temperature (room temperature: 23° C.±2° C.) and stretch ratio shown in Table 1. A stretch film having a plurality of through pores was thus produced.

<Measurement of Stress at 50% Elongation in Stretching Direction (MD)>

In a hysteresis test in MD, a test piece of 25 mm in TD and 100 mm in MD was cut from the produced stretch film, the test piece thus prepared was stretched in MD with a distance between chucks of 25 mm and at a test rate of 254 mm/min to the distance between chucks of 50 mm (100%), and the distance between chucks was returned to 25 mm without maintaining this state. The stress [N/mm$^2$] in MD when the distance between chucks was 37.5 mm (at 50% elongation) during the stretching of the test piece in MD to the distance between chucks of 50 mm (100%) was measured using a precision universal testing machine (made by SHIMADZU CORPORATION, product name: AUTOGRAPH AG-5000A). The results are shown in Table 1.

<Stress at 50% Elongation in Direction (TD) Perpendicular to Stretching Direction>

In a hysteresis test in TD, a test piece of 25 mm in MD and 100 mm in TD was cut from the produced stretch film, the test piece thus prepared was stretched in TD with a distance between chucks of 25 mm and at a test rate of 254 mm/min to the distance between chucks of 50 mm (100%), and the distance between chucks was returned to 25 mm without maintaining this state. The stress [N/mm$^2$] in TD when the distance between chucks was 37.5 mm (at 50% elongation) during the stretching of the test piece in TD to the distance between chucks of 50 mm (100%) was measured using a precision universal testing machine (made by SHIMADZU CORPORATION, product name: AUTOGRAPH AG-5000A). The results are shown in Table 1.

<Stress at 100% Elongation in Direction (TD) Perpendicular to Stretching Direction>

In a hysteresis test in TD, a test piece of 25 mm in MD and 100 mm in TD was cut from the produced stretch film, the test piece thus prepared was stretched in TD with a distance between chucks of 25 mm and at a test rate of 254 mm/min to the distance between chucks of 50 mm (100%), and the distance between chucks was returned to 25 mm without maintaining this state. The stress [N/mm$^2$] in TD when the distance between chucks was 50 mm (at 100% elongation) was measured using a precision universal testing machine (made by SHIMADZU CORPORATION, product name: AUTOGRAPH AG-5000A). The results are shown in Table 1.

<Measurement of Permanent Strain>

A strip of test piece of 25 mm in the stretching direction (MD) and 100 mm in the direction (TD) perpendicular to the stretching direction (MD) was cut from the produced stretch film, and the test piece was fixed to grips of a precision universal testing machine (made by SHIMADZU CORPORATION, product name: AUTOGRAPH AG-5000A) at a distance between the grips of 25 mm. The test piece was elongated in TD at a rate of 254 mm/min to 100% elongation (percentage elongation) as calculated by the above expression (1), and was then immediately shrunk at the same rate. The permanent strain [%] was calculated by the above expression (2). The test was performed at room temperature (23° C.±2° C.). The results are shown in Table 1.

<Measurement of Moisture Permeability>

The moisture permeability [g/(m$^2$·24 h)] of the produced stretch film was measured in accordance with JIS Z 0208 (testing methods for determination of the water vapor transmission rate of moisture-proof packaging materials (dish method)). 15 g of calcium chloride was used as a moisture absorbent, and measurement was performed in a constant-temperature and constant-humidity environment of a temperature of 40° C. and a relative humidity of 90%. The results are shown in Table 1.

Examples 2 to 5

A stretch film having the thickness shown in Table 1 was prepared in a manner similar to that of the above Example 1 except that the conditions of the uniaxial stretching in MD were changed to the conditions shown in Table 1.

Measurement of each stress, measurement of the permanent strain, and measurement of the moisture permeability were then performed in a manner similar to that of the above Example 1. The results are shown in Table 1.

Example 6

A stretch film having the thickness shown in Table 1 was prepared in a manner similar to that of the above Example 1 except that the composition of the material was changed to the composition (parts by mass) shown in Table 1 and the conditions of the uniaxial stretching in MD were changed to the conditions shown in Table 1.

Measurement of each stress, measurement of the permanent strain, and measurement of the moisture permeability were then performed in a manner similar to that of the above Example 1. The results are shown in Table 1.

Comparative Example 1

A stretch film having the thickness shown in Table 2 was prepared in a manner similar to that of the above Example 1 except that the composition of the material was changed to the composition (parts by mass) shown in Table 2 and the uniaxial stretching in MD was not performed.

Measurement of each stress, measurement of the permanent strain, and measurement of the moisture permeability were then performed in a manner similar to that of the above Example 1. The results are shown in Table 2.

Comparative Example 2

A stretch film having the thickness shown in Table 2 was prepared in a manner similar to that of the above Example 1 except that the uniaxial stretching in MD was not performed.

Measurement of each stress, measurement of the permanent strain, and measurement of the moisture permeability were then performed in a manner similar to that of the above Example 1. The results are shown in Table 2.

Comparative Examples 3 to 9

A stretch film having the thickness shown in Table 2 was prepared in a manner similar to that of the above Example 1 except that the conditions of the uniaxial stretching in MD were changed to the conditions shown in Table 2.

Measurement of each stress, measurement of the permanent strain, and measurement of the moisture permeability were then performed in a manner similar to that of the above Example 1. The results are shown in Table 2.

Comparative Example 10

A stretch film having the thickness shown in Table 2 was prepared in a manner similar to that of the above Example 1 except that the composition of the material was changed to the composition (parts by mass) shown in Table 2 and the conditions of the uniaxial stretching in MD were changed to the conditions shown in Table 2.

Measurement of each stress, measurement of the permanent strain, and measurement of the moisture permeability were then performed in a manner similar to that of the above Example 1. The results are shown in Table 2.

TABLE 1

|  |  | Example 1 | Example 2 | Example 3 | Example 4 | Example 5 | Example 6 |
|---|---|---|---|---|---|---|---|
| Mixing Ratio (Parts by Mass) | Propylene Elastomer | 25 | 25 | 25 | 25 | 25 | 35 |
| | LLDPE | 5 | 5 | 5 | 5 | 5 | — |
| | LDPE | 2 | 2 | 2 | 2 | 2 | — |
| | ULDPE | 3 | 3 | 3 | 3 | 3 | — |
| | Lubricant | 5 | 5 | 5 | 5 | 5 | 5 |
| | Inorganic Filler | 50 | 60 | 60 | 60 | 60 | 60 |
| | Overall Thickness of Stretch Film [μm] | 40 | 40 | 40 | 40 | 40 | 20 |
| Uniaxial Stretching Evaluation | Stretching Temperature [° C.] | Room Temperature | 50 | 50 | 60 | 60 | 60 |
| | Stretch Ratio [—] | 4 | 2 | 4 | 2 | 4 | 2.5 |
| | Stress at 50% Elongation in MD [MPa] | 6.2 | 8.4 | 11.2 | 8.2 | 11.3 | 9.0 |
| | Stress at 50% Elongation in TD [MPa] | 0.8 | 1.6 | 0.6 | 1.4 | 0.6 | 1.1 |
| | Stress at 100% Elongation in TD [MPa] | 0.8 | 1.8 | 0.7 | 1.6 | 0.6 | 1.3 |
| | Permanent Strain [%] | 24.4 | 14.6 | 22.4 | 19.6 | 20.7 | 15.6 |
| | Moisture Permeability [g/(m² · 24 h)] | 2378 | 1486 | 3098 | 1558 | 3493 | 2333 |

TABLE 2

|  |  | Comparative Example 1 | Comparative Example 2 | Comparative Example 3 | Comparative Example 4 | Comparative Example 5 |
|---|---|---|---|---|---|---|
| Mixing Ratio (Parts by Mass) | Propylene Elastomer | 40 | 25 | 25 | 25 | 25 |
| | LLDPE | — | 5 | 5 | 5 | 5 |
| | LDPE | — | 2 | 2 | 2 | 2 |
| | ULDPE | — | 3 | 3 | 3 | 3 |
| | Ethylene Elastomer | — | — | — | — | — |
| | Lubricant | — | 5 | 5 | 5 | 5 |
| | Inorganic Filler | 60 | 50 | 60 | 60 | 60 |
| | Overall Thickness of Stretch Film [μm] | 40 | 40 | 40 | 40 | 40 |
| Uniaxial Stretching Evaluation | Stretching Temperature [° C.] | No Stretching Performed | No Stretching Performed | Room Temperature | 50 | 50 |
| | Stretch Ratio [—] |  |  | 5 | 1.5 | 5 |
| | Stress at 50% Elongation in MD [MPa] | 4.5 | 6.7 | Broke | 7.8 | Broke |
| | Stress at 50% Elongation in TD [MPa] | 4.3 | 3.2 |  | 1.9 |  |
| | Stress at 100% Elongation in TD [MPa] | 1.4 | 3.3 |  | 2.1 |  |
| | Permanent Strain [%] | 14.0 | 22.1 |  | 17.6 |  |
| | Moisture Permeability [g/(m² · 24 h)] | 0 | 0 |  | 450 |  |

|  |  | Comparative Example 6 | Comparative Example 7 | Comparative Example 8 | Comparative Example 9 | Comparative Example 10 |
|---|---|---|---|---|---|---|
| Mixing Ratio (Parts by Mass) | Propylene Elastomer | 25 | 25 | 25 | 25 | 28 |
| | LLDPE | 5 | 5 | 5 | 5 | — |
| | LDPE | 2 | 2 | 2 | 2 | — |
| | ULDPE | 3 | 3 | 3 | 3 | — |
| | Ethylene Elastomer | — | — | — | — | 12 |
| | Lubricant | 5 | 5 | 5 | 5 | — |
| | Inorganic Filler | 60 | 60 | 50 | 50 | 50 |
| | Overall Thickness of Stretch Film [μm] | 40 | 40 | 40 | 40 | 80 |
| Uniaxial | Stretching Temperature [° C.] | 60 | 60 | 70 | 70 | Room Temperature |

TABLE 2-continued

| Stretching Evaluation | Stretch Ratio [—] | 1.5 | 5 | 2 | 4 | 3.8 |
|---|---|---|---|---|---|---|
| | Stress at 50% Elongation in MD [MPa] | 7.5 | Broke | Broke | Broke | 1.9 |
| | Stress at 50% Elongation in TD [MPa] | 1.9 | | | | 0.9 |
| | Stress at 100% Elongation in TD [MPa] | 2.2 | | | | 1.2 |
| | Permanent Strain [%] | 17.7 | | | | 12.1 |
| | Moisture Permeability [g/(m²·24 h)] | 900 | | | | 553 |

As shown in Table 1, in the stretch films of Examples 1 to 6, the stress at 50% elongation in MD was 6.0 N/mm² or more and 15.0 N/mm² or less, and the moisture permeability was 1000 g/(m²·24 h) or more. This shows that stretching of the film can be prevented and both excellent stretchability and moisture permeability can be obtained.

On the other hand, as shown in Table 2, in the stretch film of Comparative Example 1, the material of the film contained no polyethylene resin, and the uniaxial stretching in MD was not performed. Therefore, the stress at 50% elongation in MD was less than 6.0 N/mm², and no through pores were formed (that is, the moisture permeability was 0 g/(m²·24 h)). This shows poor stretchability and poor moisture permeability.

In the stretch film of Comparative Example 2, the uniaxial stretching in MD was not performed, and therefore no through pores were formed (that is, the moisture permeability was 0 g/(m²·24 h)). This shows poor moisture permeability.

In the stretch films of Comparative Examples 3, 5 and 7, the stretch ratio during film forming by the uniaxial stretching was larger than 4.5 times. Therefore, the films broke during the stretching of the films.

In the stretch films of Comparative Examples 4 and 6, the stretch ratio during film forming by the uniaxial stretching was smaller than 1.8 times. Therefore, porosity formation was not facilitated by the uniaxial stretching, and the moisture permeability was less than 1000 g/(m²·24 h). This shows poor moisture permeability.

In the stretched films of Comparative Examples 8 and 9, the stretching temperature during film forming by the uniaxial stretching was 70° C. or more. Therefore, the stretch films melted and broke.

In the stretched film of Comparative Example 10, the stretching temperature was less than the melting point of the elastomer. Therefore, fixing of the oriented state by heat did not proceed, and the residual strain was reduced, causing reduction in stress. Moreover, since the formed through pores were closed due to the stretchability of the elastomer, the stress at 50% elongation in MD was less than 6.0 N/mm², and the moisture permeability was less than 1000 g/(m²·24 h). This shows poor stretchability and poor moisture permeability.

As described above, the present invention is suitable for a stretch film used in the sanitation field (such as menstrual products and incontinence products) and the medical field (such as surgical drapes), and a method for producing the same.

The invention claimed is:

1. A stretch film containing an olefin elastomer and an inorganic filler, wherein
 stress at 50% elongation is 6.0 N/mm² or more and 15.0 N/mm² or less, and moisture permeability is 1000 g/(m²·24 h) or more.
2. The stretch film of claim 1, wherein
 the olefin elastomer is a propylene elastomer.
3. The stretch film of claim 1, wherein
 the stretch film is stretched in at least a uniaxial direction, and stress at 50% elongation in a stretching direction is 6.0 N/mm² or more and 15.0 N/mm² or less.
4. The stretch film of claim 1, wherein
 the stretch film has a plurality of through pores.
5. The stretch film of claim 1, wherein
 an overall thickness of the film is 10 μm to 80 μm.
6. A method for producing a stretch film, the method including at least the steps of
 preparing a primary film containing an olefin elastomer and an inorganic filler, and
 uniaxially stretching the primary film, wherein
 a stretching temperature during film forming by the uniaxial stretching is 20° C. or more and less than 70° C., and a stretch ratio is 1.8 times or more and 4.5 times or less.
7. The stretch film of claim 2, wherein the stretch film is stretched in at least a uniaxial direction, and stress at 50% elongation in a stretching direction is 6.0 N/mm² or more and 15.0 N/mm² or less.
8. The stretch film of claim 2, wherein the stretch film has a plurality of through pores.
9. The stretch film of claim 3, wherein the stretch film has a plurality of through pores.
10. The stretch film of claim 2, wherein an overall thickness of the film is 10 μm to 80 μm.
11. The stretch film of claim 3, wherein an overall thickness of the film is 10 μm to 80 μm.
12. The stretch film of claim 4, wherein an overall thickness of the film is 10 μm to 80 μm.

* * * * *